United States Patent
Zheng et al.

(10) Patent No.: US 11,503,666 B2
(45) Date of Patent: Nov. 15, 2022

(54) CARRIER AGGREGATION CONFIGURATION INFORMATION PROCESSING METHOD AND TERMINAL

(71) Applicant: VIVO MOBILE COMMUNICATION CO., LTD., Guangdong (CN)

(72) Inventors: Qian Zheng, Chang'an Dongguan (CN); Xiaodong Yang, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 12 days.

(21) Appl. No.: 17/133,011

(22) Filed: Dec. 23, 2020

(65) Prior Publication Data

US 2021/0120623 A1 Apr. 22, 2021

Related U.S. Application Data

(63) Continuation of application No. PCT/CN2019/092724, filed on Jun. 25, 2019.

(30) Foreign Application Priority Data

Jun. 25, 2018 (CN) .......................... 201810663355.7

(51) Int. Cl.
*H04W 76/27* (2018.01)
*H04W 76/19* (2018.01)

(52) U.S. Cl.
CPC ........... *H04W 76/27* (2018.02); *H04W 76/19* (2018.02)

(58) Field of Classification Search
CPC ..... H04W 76/10; H04W 76/11; H04W 76/15; H04W 76/19; H04W 76/27; H04W 76/30
See application file for complete search history.

(56) References Cited

U.S. PATENT DOCUMENTS

2013/0322372 A1* 12/2013 Kim ................. H04L 5/0035
370/329
2014/0119224 A1* 5/2014 Keskitalo ............. H04W 24/10
370/252

(Continued)

FOREIGN PATENT DOCUMENTS

| CN | 106797289 A | 5/2017 | |
| CN | 109803280 B * | 4/2021 | ............ H04W 24/02 |
| WO | 2018/083369 A1 | 5/2018 | |

OTHER PUBLICATIONS

"Fast SCell Configuration and Activation Through network assisted RRC_Idle mode measurements" 3GPP TSG-RAN2 Meeting #99, R2-1710152, Qualcomm Incorporated, Oct. 9, 2017.

(Continued)

*Primary Examiner* — Jean A Gelin
(74) *Attorney, Agent, or Firm* — Maschoff Brennan (57) ABSTRACT

A CA configuration information processing method and a terminal are provided. The method includes: in a process in which a terminal performs radio resource control RRC connection resumption, processing CA configuration information based on measurement behavior of the terminal in a non-connected state, or processing the CA configuration information according to a processing instruction sent by a network side device, or processing the CA configuration information based on the measurement behavior of the terminal in the non-connected state and according to the processing instruction sent by the network side device.

19 Claims, 4 Drawing Sheets

(56) References Cited

U.S. PATENT DOCUMENTS

| | | | |
|---|---|---|---|
| 2014/0119265 A1* | 5/2014 | Shauh | H04W 4/06 370/312 |
| 2015/0215900 A1* | 7/2015 | Jung | H04W 72/085 370/329 |
| 2015/0327054 A1 | 11/2015 | Callender et al. | |
| 2015/0341945 A1* | 11/2015 | Panchal | H04W 72/085 370/329 |
| 2017/0347270 A1* | 11/2017 | Iouchi | H04W 72/0446 |
| 2018/0359669 A1* | 12/2018 | Fujishiro | H04W 74/0833 |
| 2019/0037629 A1* | 1/2019 | Ryu | H04W 76/28 |
| 2019/0037634 A1* | 1/2019 | Kadiri | H04W 74/0833 |
| 2019/0045570 A1* | 2/2019 | Lu | H04W 74/0833 |
| 2019/0058508 A1* | 2/2019 | Yiu | H04B 7/043 |
| 2019/0150218 A1* | 5/2019 | Futaki | H04W 4/70 370/329 |
| 2019/0230572 A1* | 7/2019 | Cheng | H04W 28/24 |
| 2019/0320488 A1* | 10/2019 | Mildh | H04W 76/19 |
| 2020/0145878 A1* | 5/2020 | Jin | H04W 76/11 |
| 2020/0178107 A1* | 6/2020 | Miao | H04W 72/085 |
| 2021/0014714 A1* | 1/2021 | Kim | H04W 24/10 |
| 2021/0067933 A1* | 3/2021 | Ke | H04L 67/16 |
| 2021/0112431 A1* | 4/2021 | Kazmi | H04W 76/18 |

OTHER PUBLICATIONS

"RRC Suspended and CA establishment", 3GPP TSG-RAN WG2 #101bis, Tdoc R2-1805829, Ericsson, Apr. 16, 2018.
Written Opinion and International Search Report in Application No. PCT/CN2019/092724 dated Jan. 7, 2021.

* cited by examiner

CARRIER AGGREGATION CONFIGURATION INFORMATION PROCESSING METHOD AND TERMINAL

CROSS-REFERENCE TO RELATED APPLICATIONS

This application is a continuation application of PCT Application No. PCT/CN2019/092724 filed on Jun. 25, 2019, which claims priority to Chinese Patent Application No. 201810663355.7, filed in China on Jun. 25, 2018, which is incorporated herein by reference in its entirety.

TECHNICAL FIELD

This disclosure relates to the field of communications technologies, and in particular, to a carrier aggregation (CA) configuration information processing method and a terminal.

BACKGROUND

A long term evolution (LTE) system introduces a carrier aggregation (CA) technology and an enhancing CA utilization (EuCA) technology. In the carrier aggregation technology, a terminal may be connected to and communicate with a network side device through a plurality of cells (Cell). In the enhancing CA utilization technology, a network side device may indicate measurement configuration information of a terminal in a radio resource control (RRC) non-connected state (which may include an RRC idle state (idle state) or an RRC inactive state (inactive state)), so that when the terminal enters an RRC connected state (connected state), the network side device can directly configure a secondary cell (SCell) to an activated state (activated state) or a dormant state (dormant state) based on a measurement result of the terminal in the non-connected state.

After an RRC connection of the terminal is suspended (Suspend), if the terminal needs to resume (Resume) the RRC connection, the network side device needs to reconfigure CA configuration information for the terminal. This results in relatively large signaling overheads in an RRC connection resumption process.

SUMMARY

Embodiments of this disclosure provide a CA configuration information processing method and a terminal, to resolve a problem that signaling overheads are relatively large in an RRC connection resumption process.

According to a first aspect, an embodiment of this disclosure provides a CA configuration information processing method, applied to a terminal, where the terminal is configured with measurement configuration information for a non-connected state, and the method includes:

in a process in which the terminal performs radio resource control RRC connection resumption, processing CA configuration information based on measurement behavior of the terminal in the non-connected state, or processing the CA configuration information according to a processing instruction sent by a network side device, or processing the CA configuration information based on the measurement behavior of the terminal in the non-connected state and according to the processing instruction sent by the network side device, where the CA configuration information is access stratum context information stored on the terminal; and the processing instruction is used to instruct to resume at least partial information in the CA configuration information, or is used to instruct to clear at least partial information in the CA configuration information.

According to a second aspect, an embodiment of this disclosure provides a terminal, where the terminal is configured with measurement configuration information for a non-connected state, and the terminal includes a processing module, configured to:

in a process in which the terminal performs radio resource control RRC connection resumption, process CA configuration information based on measurement behavior of the terminal in the non-connected state, or process the CA configuration information according to a processing instruction sent by a network-side device, or process the CA configuration information based on the measurement behavior of the terminal in the non-connected state and according to the processing instruction sent by the network-side device, where the CA configuration information is access stratum context information stored on the terminal; and the processing instruction is used to instruct to resume at least partial information in the CA configuration information, or is used to instruct to clear at least partial information in the CA configuration information.

According to a third aspect, an embodiment of this disclosure provides a terminal, including a memory, a processor, and a computer program stored in the memory and capable of running on the processor, where when the computer program is executed by the processor, the steps of the CA configuration information processing method that corresponds to a terminal and that is provided in the embodiments of this disclosure are implemented.

According to a fourth aspect, an embodiment of this disclosure provides a computer-readable storage medium, where the computer-readable storage medium stores a computer program, and when the computer program is executed by a processor, the steps of the CA configuration information processing method that corresponds to a terminal and that is provided in the embodiments of this disclosure are implemented.

In this way, in the embodiments of this disclosure, in the RRC connection resumption process, the terminal may process, based on the measurement behavior of the terminal in the non-connected state and/or according to the processing instruction sent by the network side device, the CA configuration information stored on the terminal. Processed CA configuration information may be used for the RRC connection resumption for the terminal, to reduce signaling overheads in the RRC connection resumption process, and further support fast carrier aggregation resumption.

BRIEF DESCRIPTION OF DRAWINGS

To describe the technical solutions in the embodiments of this disclosure more clearly, the following briefly describes the accompanying drawings required for describing the embodiments of this disclosure. Apparently, the accompanying drawings in the following description show merely some embodiments of this disclosure, and a person of ordinary skill in the art may still derive other drawings from these accompanying drawings without creative efforts.

DESCRIPTION OF EMBODIMENTS

The following clearly describes the technical solutions in the embodiments of this disclosure with reference to the accompanying drawings in the embodiments of this disclosure. Apparently, the described embodiments are some rather than all of the embodiments of this disclosure. All other embodiments obtained by a person of ordinary skill in the art based on the embodiments of this disclosure without creative efforts shall fall within the protection scope of this disclosure.

Terms "include", "comprise" and any other variants thereof in the specification and claims of the application are intended to cover the non-exclusive inclusion. For example, a process, method, system, product, or device that includes a series of steps or units is not necessarily limited to those expressly listed steps or units, but may include other steps or units not expressly listed or inherent to such process, method, system, product, or device. Moreover, use of "and/or" in the specification and claims represents at least one of the connected objects. For example, A and/or B means three cases: A alone, B alone, or A and B together.

In the embodiments of this disclosure, the terms "exemplary" or "for example" are used to represent an example, an illustration, or a description. Any embodiment or design scheme described as "exemplary" or "for example" in the embodiments of this disclosure should not be construed as being more preferred or advantageous than other embodiments or design schemes. To be precise, the use of terms such as "exemplary" or "for example" is intended to present a related concept in a specific manner.

The embodiments of this disclosure are introduced below with reference to the accompanying drawings. A CA configuration information processing method and a terminal that are provided in the embodiments of this disclosure may be applied to a wireless communications system. The wireless communication system may be a 5G system, or an evolved long term evolution (eLTE) system, or a later evolved communication system.

Figure 1:
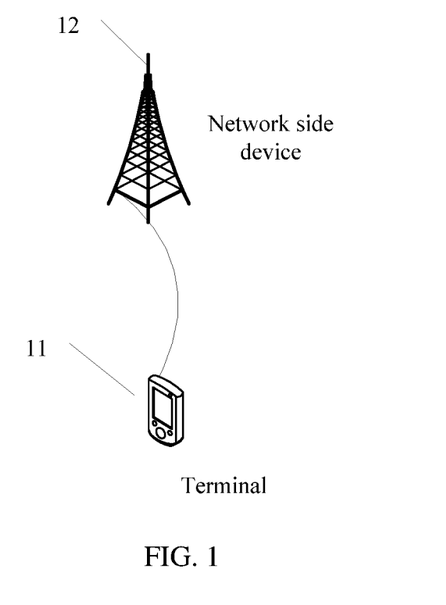
FIG. 1 is a structural diagram of a CA configuration information processing system according to an embodiment of this disclosure.

FIG. 1 is a structural diagram of a CA configuration information processing system according to an embodiment of this disclosure. As shown in FIG. 1, the CA configuration information processing system includes a terminal (UE) 11 and a network side device 12. The terminal 11 may be a mobile communications terminal, for example, a terminal side device such as a mobile phone, a tablet computer (Tablet Computer), a laptop computer (Laptop Computer), a personal digital assistant (PDA), a mobile Internet device (MID), or a wearable device (Wearable Device). It should be noted that a specific type of the terminal 11 is not limited in this embodiment of this disclosure. The network side device 12 may be a 5G network side device (for example, a gNB or a 5G NR NB), a 4G network side device (for example, an eNB), a 3G network side device (for example, an NB), a network side device in a later evolved communications system, or the like. It should be noted that a specific type of the network side device 12 is not limited in this embodiment of this disclosure.

In the related art, the LTE enhancing CA utilization (EuCA) project is working on an enhancement to a carrier aggregation technology and has introduced a fast activation and deactivation function. Fast activation and deactivation may refer to fast activation and deactivation of carriers that is applicable to eLTE or 5G NR systems, fast activation and deactivation of secondary cells (SCell) that is applicable to eLTE or 5G NR systems, or fast activation and deactivation of bandwidth parts (BWP) that is applicable to 5G NR systems.

In the eLTE and 5G NR systems, in addition to an RRC connected state and an RRC idle state, an independent RRC state called an RRC inactive state is further introduced. The idle state and inactive state can be referred to as non-connected states herein. Therefore, the embodiments of this disclosure can be applied to idle-state or inactive-state terminals in an eLTE or 5G NR system.

In the embodiments of this disclosure, a terminal is configured with measurement configuration information for a non-connected state. In other words, the terminal is a terminal that has a measurement capability in the non-connected state, and the terminal is configured with the measurement configuration information before the terminal moves to a current network side device or is under the current network side device. The measurement configuration information may include content such as a measurement frequency, a measurement validity time, and a measurement validity area.

Figure 2:
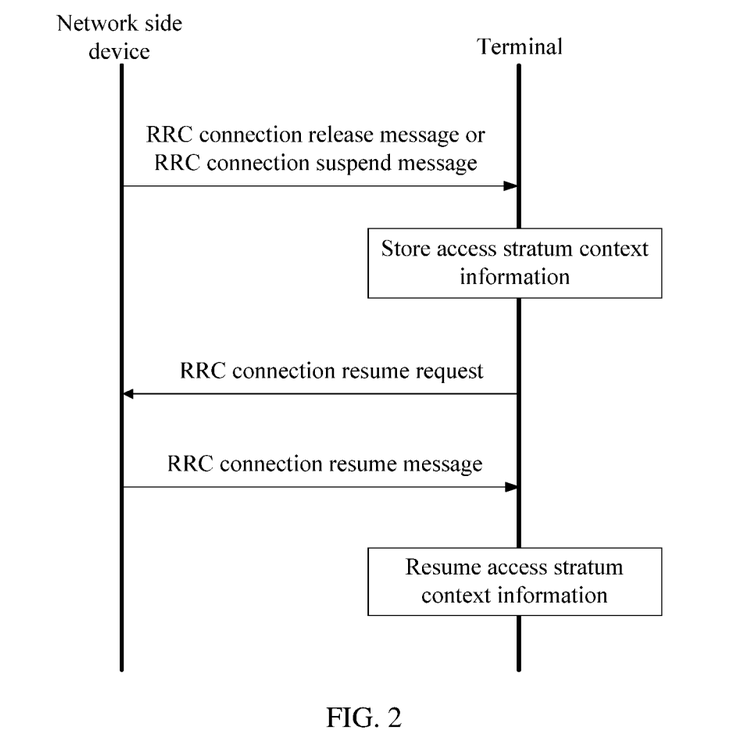
FIG. 2 is a flowchart of an RRC connection suspension and RRC connection resumption process.

When the terminal receives an RRC connection release message or an RRC connection suspend message sent by the network side device, the terminal enters into an inactive state or an idle state from a connected state. When the terminal receives an RRC connection resume message sent by the network side device, the terminal may enter into the connected state from the inactive state. When receiving the RRC connection release message or the RRC connection suspend message, the terminal may store access stratum context information. In a subsequent RRC connection resumption process, the terminal may resume an RRC connection based on the previously stored access stratum context information, as shown in FIG. 2.

In the related art, because of mobility of a terminal and variability of an actual network channel condition, in a process in which the terminal enters a connected state from a non-connected state, a network side device needs to reconfigure CA configuration information for the terminal. This results in relatively large signaling overheads in an RRC connection resumption process.

Based on this, the embodiments of this disclosure are intended to combine CA with an RRC connection suspension and RRC connection resumption process, to support resumption to a previous CA configuration when a terminal enters a connected state from a non-connected state. In addition, in consideration of mobility of the terminal and variability of an actual network channel condition, CA configuration information needs to be processed, so that processed CA configuration information may be used for RRC connection resumption for the terminal.

To achieve the foregoing objective, an embodiment of this disclosure provides a CA configuration information processing system shown in FIG. 1, and provides a CA configuration information processing method applied to the CA configuration information processing system. The method is as follows:

in a process in which a terminal performs RRC connection resumption, processing CA configuration information based on measurement behavior of the terminal in a non-connected state, or processing the CA configuration information according to a processing instruction sent by a network side device, or processing the CA configuration information based on the measurement behavior of the terminal in the non-connected state and according to the processing instruction sent by the network side device, where the CA configuration information is access stratum context (AS Context) information stored on the terminal, for example, the CA configuration information may be access stratum context information stored on the terminal when the terminal receives an RRC connection release message or an RRC connection suspend message; and the processing instruction is used to instruct to resume at least partial information in the CA configuration information, or is used to instruct to clear at least partial information in the CA configuration information.

In this embodiment of this disclosure, in the RRC connection resumption process, the terminal may process, based on the measurement behavior of the terminal in the non-connected state and/or according to the processing instruction sent by the network side device, the CA configuration information stored on the terminal. The processed CA configuration information may be used for the RRC connection resumption for the terminal, to reduce signaling overheads in the RRC connection resumption process, and further support fast carrier aggregation resumption.

Figure 3:
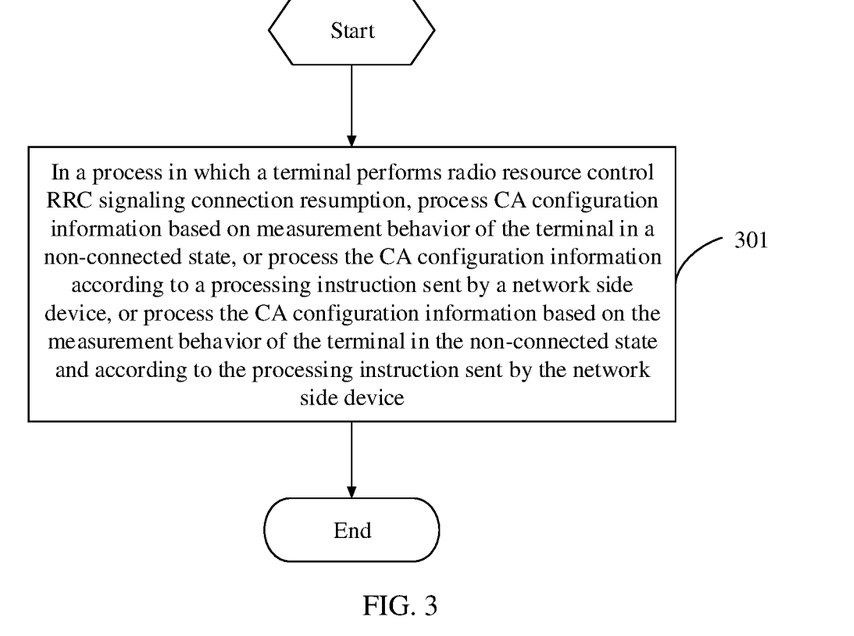
FIG. 3 is a flowchart of a CA configuration information processing method according to an embodiment of this disclosure.

FIG. 3 is a flowchart of a CA configuration information processing method according to an embodiment of this disclosure.

The CA configuration information processing method according to this embodiment of this disclosure is applied to a terminal, and the terminal is configured with measurement configuration information for a non-connected state.

In this embodiment of this disclosure, the terminal may be understood as a terminal that has a measurement capability in a non-connected state. In a 5G NR system, for example, a non-connected state of a terminal may be an idle state or an inactive state. The terminal is a terminal that has a measurement capability in an idle state and/or an inactive state. Before the terminal moves to a network side device B (a network side device in the embodiments of this disclosure may be understood as the network side device B) from a network side device A or is under the network side device B, the terminal is configured with measurement configuration information for the idle state and/or the inactive state.

As shown in FIG. 3, the CA configuration information processing method includes the following steps.

Step 301: In a process in which the terminal performs radio resource control RRC connection resumption, process CA configuration information based on measurement behavior of the terminal in the non-connected state, or process the CA configuration information according to a processing instruction sent by a network side device, or process the CA configuration information based on the measurement behavior of the terminal in the non-connected state and according to the processing instruction sent by the network side device.

The CA configuration information is access stratum context information stored on the terminal, for example, the CA configuration information may be access stratum context information stored on the terminal when the terminal receives an RRC connection release message or an RRC connection suspend message.

The processing instruction is used to instruct to resume at least partial information in the CA configuration information, or is used to instruct to clear at least partial information in the CA configuration information.

The CA configuration information may include at least one of the following:

cell type information, cell identifier information, cell state information, cell SDAP layer configuration information, cell PDCP layer configuration information, cell radio link control (RLC) layer configuration information, cell MAC layer configuration information, or cell physical layer configuration information.

The cell type may include a primary cell (PCell) or a secondary cell (SCell).

The cell identifier may include at least one of an SCell identifier (SCell ID), a serving cell identifier (Serving Cell ID), a carrier type identifier (a supplementary uplink (SUL) carrier or a non-SUL carrier), or a carrier bandwidth part identifier (BWP ID).

The cell state may include any one of a deactivated state (deactivated state), an activated state (activated state), and a dormant state (dormant state).

The processing instruction may be included in an RRC connection resume message sent by the network side device.

The processing instruction may be used to instruct to resume at least partial information in the CA configuration information, or may be used to instruct to clear at least partial information in the CA configuration information.

It should be noted that the network side device may send the processing instruction, or may not send the processing instruction. That the network side device sends the processing instruction may be understood as that the network side device explicitly instructs, by using the processing instruction, to process the CA configuration information. That the network side device does not send the processing instruction may be understood as that the network side device does not explicitly instruct to process the CA configuration information.

In this embodiment of this disclosure, when the network side device sends the processing instruction, the terminal may process the CA configuration information only according to the processing instruction, or may process the CA configuration information both according to the processing instruction and based on the measurement behavior of the terminal in the non-connected state; or when the network side device does not send the processing instruction, the terminal may process the CA configuration information based on the measurement behavior of the terminal in the non-connected state.

The following describes in detail, by using the following embodiments, how the terminal processes the CA configuration information.

Embodiment 1

The terminal may process the CA configuration information based on the measurement behavior of the terminal in the non-connected state.

In this embodiment, the processing CA configuration information based on measurement behavior of the terminal in the non-connected state includes:

when the measurement behavior of the terminal in the non-connected state is valid and non-resumed information exists in the CA configuration information, clearing the non-resumed information in the CA configuration information; or when the measurement behavior of the terminal in the non-connected state is invalid and uncleared information exists in the CA configuration information, resuming the uncleared information in the CA configuration information; or when the measurement behavior of the terminal in the non-connected state is valid, resuming at least partial information in the CA configuration information; or when the measurement behavior of the terminal in the non-connected state is invalid, clearing at least partial information in the CA configuration information.

Whether the measurement behavior of the terminal in the non-connected state is valid may be determined by determining whether at least one of the following conditions is met:

a measurement validity timer of the terminal is running;

the terminal is located in a measurement validity area;

the terminal has an available measurement result; or the terminal receives a broadcast message sent by the network side device, for example, a system information block type 2 (SIB2) or remaining minimum system information (RMSI), where the broadcast message is used to indicate that the network side device is capable of receiving a measurement result of the terminal in the non-connected state, or is used to indicate that a cell supports an enhancing CA utilization function or a fast carrier activation and deactivation function.

If at least one of the foregoing conditions is met, it may be considered that the measurement behavior of the terminal in the non-connected state is valid; or if at least one of the foregoing conditions is not met, it may be considered that the measurement behavior of the terminal in the non-connected state is invalid.

It should be noted that either that the measurement behavior of the terminal in the non-connected state is valid or that the measurement behavior of the terminal in the non-connected state is invalid may be defined in a future protocol. This is not limited in this embodiment of this disclosure.

Optionally, the processing CA configuration information based on measurement behavior of the terminal in the non-connected state further includes:

when the measurement behavior of the terminal in the non-connected state is valid and non-resumed information exists in the CA configuration information, clearing the non-resumed information in the CA configuration information; or when the measurement behavior of the terminal in the non-connected state is invalid and uncleared information exists in the CA configuration information, resuming the uncleared information in the CA configuration information.

When the measurement behavior of the terminal in the non-connected state is valid, for example, if measurement of the terminal in an idle state or an inactive state is ongoing (in other words, a measurement validity timer of the terminal is running), the terminal may resume PCell configuration information or some SCell configuration information in the CA configuration information with reference to a measurement result.

The SCell configuration information that can be resumed may include: some higher-layer configuration information of some SCells (for example, service data adaptation protocol (SDAP) layer configuration information of some SCells, or packet data convergence protocol (PDCP) layer configuration information of some SCells), SCell IDs of some SCells, state configuration information of some SCells, and the like. However, some underlying configuration information of some SCells (for example, medium access control (MAC) layer configuration information of some SCells, or physical layer configuration information of some SCells) may be cleared. Therefore, when the network side device reconfigures CA configuration information for the terminal, signaling overheads can be reduced.

Further, for example, the CA configuration information is {PCell, SCell 1, SCell 2}. When the measurement behavior of the terminal in the non-connected state is valid, the terminal may resume configuration information of the PCell and the SCell 1, and may further clear configuration information of the SCell 2.

When the measurement behavior of the terminal in the non-connected state is invalid, for example, if measurement of the terminal in an idle state or an inactive state has stopped (in other words, a measurement validity timer of the terminal has expired), the terminal may clear configuration information of all SCells in the CA configuration information, and reserve only configuration information of a PCell. Further, the configuration information of the PCell that can be reserved may include: some higher-layer configuration information of the PCell, for example, SDAP layer configuration information of the PCell, or PDCP layer configuration information of the PCell. However, some underlying configuration information of the PCell, for example, MAC layer configuration information of the PCell or physical layer configuration information of the PCell, may be cleared. Therefore, when the network side device reconfigures CA configuration information for the terminal, signaling overheads can be reduced.

Further, for example, the CA configuration information is {PCell, SCell 1, SCell 2}. When the measurement behavior of the terminal in the non-connected state is invalid, the terminal may resume configuration information of the PCell, and may further clear configuration information of the SCell 1 and the SCell 2.

Embodiment 2

The terminal may process the CA configuration information according to the processing instruction sent by the network side device.

In this embodiment, the processing the CA configuration information according to a processing instruction sent by a network side device includes:

when the processing instruction is used to instruct to resume at least partial information in the CA configuration information, resuming at least partial information in the CA configuration information; or when the processing instruction is used to instruct to clear at least partial information in the CA configuration information, clearing at least partial information in the CA configuration information.

Optionally, the processing the CA configuration information according to a processing instruction sent by a network side device further includes:

when the processing instruction is used to instruct to resume at least partial information in the CA configuration information and non-resumed information exists in the CA configuration information, clearing the non-resumed information in the CA configuration information; or when the processing instruction is used to instruct to clear at least partial information in the CA configuration information and uncleared information exists in the CA configuration information, resuming the uncleared information in the CA configuration information.

In this embodiment, the terminal may process the CA configuration information only according to the processing instruction sent by the network side device. The processing instruction may instruct the terminal to resume all the CA configuration information, or may instruct the terminal to resume a part of the CA configuration information, or may instruct the terminal to clear all the CA configuration information. Therefore, when the network side device reconfigures CA configuration information for the terminal, signaling overheads can be reduced.

For example, the CA configuration information is {PCell, SCell 1, SCell 2}. When the processing instruction sent by the network side device instructs to resume the PCell and the SCell 1, the terminal may resume configuration information of the PCell and the SCell 1, and may further clear configuration information of the S Cell 2; or when the processing instruction sent by the network side device instructs to clear the SCell 1, the terminal may clear configuration information of the SCell 1, and may further resume configuration information of the PCell and the SCell 2.

Embodiment 3

The terminal may process the CA configuration information based on the measurement behavior of the terminal in the non-connected state and according to the processing instruction sent by the network side device.

In this embodiment, the processing the CA configuration information based on the measurement behavior of the terminal in the non-connected state and according to the processing instruction sent by the network side device includes:

when the measurement behavior of the terminal in the non-connected state is valid and the processing instruction is used to instruct to resume at least partial information in the CA configuration information, resuming at least partial information in to-be-resumed information indicated in the processing instruction.

Optionally, the processing the CA configuration information based on the measurement behavior of the terminal in the non-connected state and according to the processing instruction sent by the network side device further includes:

when the measurement behavior of the terminal in the non-connected state is valid, the processing instruction is used to instruct to resume at least partial information in the CA configuration information, and non-resumed information exists in the CA configuration information, clearing the non-resumed information in the CA configuration information.

For example, the CA configuration information is {PCell, SCell 1, SCell 2}. When the processing instruction sent by the network side device instructs to resume the PCell and the SCell 1, the terminal considers resumption of configuration information of only the PCell and the SCell 1. Whether the terminal finally resumes the configuration information of the PCell and the S Cell 1 needs to be further determined based on the measurement behavior of the terminal in the non-connected state, for example, whether the terminal is located in the valid measurement region. If the terminal is located in the valid measurement region, the terminal resumes the configuration information of the PCell and the SCell 1 according to the processing instruction sent by the network side device. If the terminal selects a cell beyond the valid measurement region, the terminal may not resume the configuration information of the PCell and the SCell 1, that is, the terminal may clear the configuration information of the PCell and the SCell 1. Therefore, when the network side device reconfigures CA configuration information for the terminal, signaling overheads can be reduced.

In the foregoing embodiments, a plurality of possible definitions are made for a condition for resuming or clearing the CA configuration information, and content that is in the CA configuration information and that can be resumed or cleared (however, the possible definitions in the foregoing embodiments do not constitute a limitation). Therefore, when the network side device reconfigures CA configuration information for the terminal, signaling overheads can be reduced, thereby further supporting fast carrier aggregation resumption.

In this embodiment of this disclosure, in the RRC connection resumption process, the terminal may process, based on the measurement behavior of the terminal in the non-connected state and/or according to the processing instruction sent by the network side device, the CA configuration information stored on the terminal. The processed CA configuration information may be used for the RRC connection resumption for the terminal, to reduce signaling overheads in the RRC connection resumption process, and further support fast carrier aggregation resumption.

Figure 4:
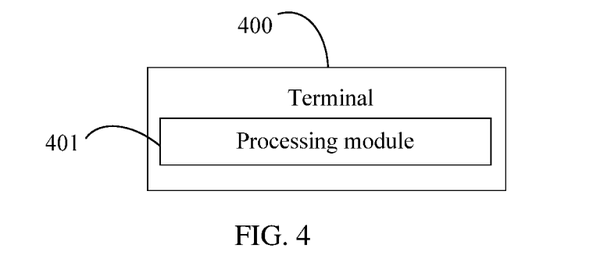
FIG. 4 is a structural diagram of a terminal according to an embodiment of this disclosure.

FIG. 4 is a structural diagram of a terminal according to an embodiment of this disclosure. As shown in FIG. 4, the terminal 400 includes a processing module 401, configured to:

in a process in which the terminal performs radio resource control RRC connection resumption, process CA configuration information based on measurement behavior of the terminal in a non-connected state, or process the CA configuration information according to a processing instruction sent by a network side device, or process the CA configuration information based on the measurement behavior of the terminal in the non-connected state and according to the processing instruction sent by the network side device.

The CA configuration information is access stratum context information stored on the terminal.

The processing instruction is used to instruct to resume at least partial information in the CA configuration information, or is used to instruct to clear at least partial information in the CA configuration information.

Optionally, the processing module 401 is specifically configured to:

when the measurement behavior of the terminal in the non-connected state is valid, resume at least partial information in the CA configuration information; or when the measurement behavior of the terminal in the non-connected state is invalid, clear at least partial information in the CA configuration information.

Optionally, the processing module 401 is further configured to:

when the measurement behavior of the terminal in the non-connected state is valid and non-resumed information exists in the CA configuration information, clear the non-resumed information in the CA configuration information; or when the measurement behavior of the terminal in the non-connected state is invalid and uncleared information exists in the CA configuration information, resume the uncleared information in the CA configuration information.

Figure 5:
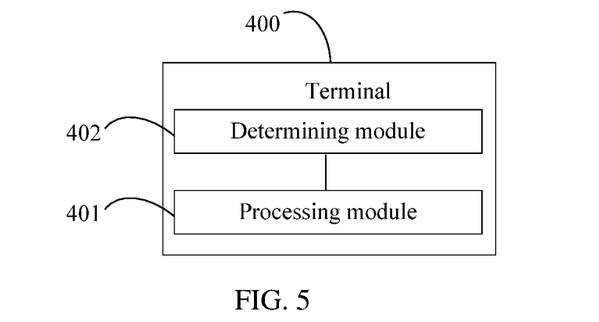
FIG. 5 is a structural diagram of another terminal according to an embodiment of this disclosure.

Optionally, as shown FIG. 5, the terminal 400 further includes a determining module 402, configured to:

determine whether at least one of the following conditions is met:

a measurement validity timer of the terminal is running;
the terminal is located in a measurement validity area;
the terminal has an available measurement result; or the terminal receives a broadcast message sent by the network side device, where the broadcast message is used to indicate that the network side device is capable of receiving a measurement result of the terminal in the non-connected state, or is used to indicate that a cell supports an enhancing CA utilization function or a fast carrier activation and deactivation function.

If at least one of the conditions is met, the measurement behavior of the terminal in the non-connected state is valid; or if at least one of the conditions is not met, the measurement behavior of the terminal in the non-connected state is invalid.

Optionally, the processing module 401 is specifically configured to:

when the processing instruction is used to instruct to resume at least partial information in the CA configuration information, resume at least partial information in the CA configuration information; or when the processing instruction is used to instruct to clear at least partial information in the CA configuration information, clearing at least partial information in the CA configuration information.

Optionally, the processing module 401 is further configured to:

when the processing instruction is used to instruct to resume at least partial information in the CA configuration information and non-resumed information exists in the CA configuration information, clear the non-resumed information in the CA configuration information; or when the processing instruction is used to instruct to clear at least partial information in the CA configuration information and uncleared information exists in the CA configuration information, resuming the uncleared information in the CA configuration information.

Optionally, the processing module 401 is specifically configured to:

when the measurement behavior of the terminal in the non-connected state is valid and the processing instruction is used to instruct to resume at least partial information in the CA configuration information, resume at least partial information in to-be-resumed information indicated in the processing instruction.

Optionally, the processing module 401 is further configured to:

when the measurement behavior of the terminal in the non-connected state is valid, the processing instruction is used to instruct to resume at least partial information in the CA configuration information, and non-resumed information exists in the CA configuration information, clear the non-resumed information in the CA configuration information.

Optionally, the processing instruction is included in an RRC connection resume message sent by the network side device.

Optionally, the CA configuration information includes at least one of the following:

cell type information, cell identifier information, cell state information, cell SDAP layer configuration information, cell PDCP layer configuration information, cell RLC layer configuration information, cell MAC layer configuration information, or cell physical layer configuration information.

Optionally, the cell type includes primary cell or secondary cell;

the cell identifier includes at least one of a secondary cell identifier, a serving cell identifier, a carrier type identifier, or a carrier bandwidth part identifier; and the cell state includes any one of a deactivated state, an activated state, and a dormant state.

It should be noted that the terminal 400 in this embodiment of this disclosure may be a terminal in any implementation of the method embodiments. Any implementation of the terminal in the method embodiments can be implemented by the terminal 400 in this embodiment of this disclosure, and the same beneficial effect can be achieved. To avoid repetition, details are not described herein again.

Figure 6:
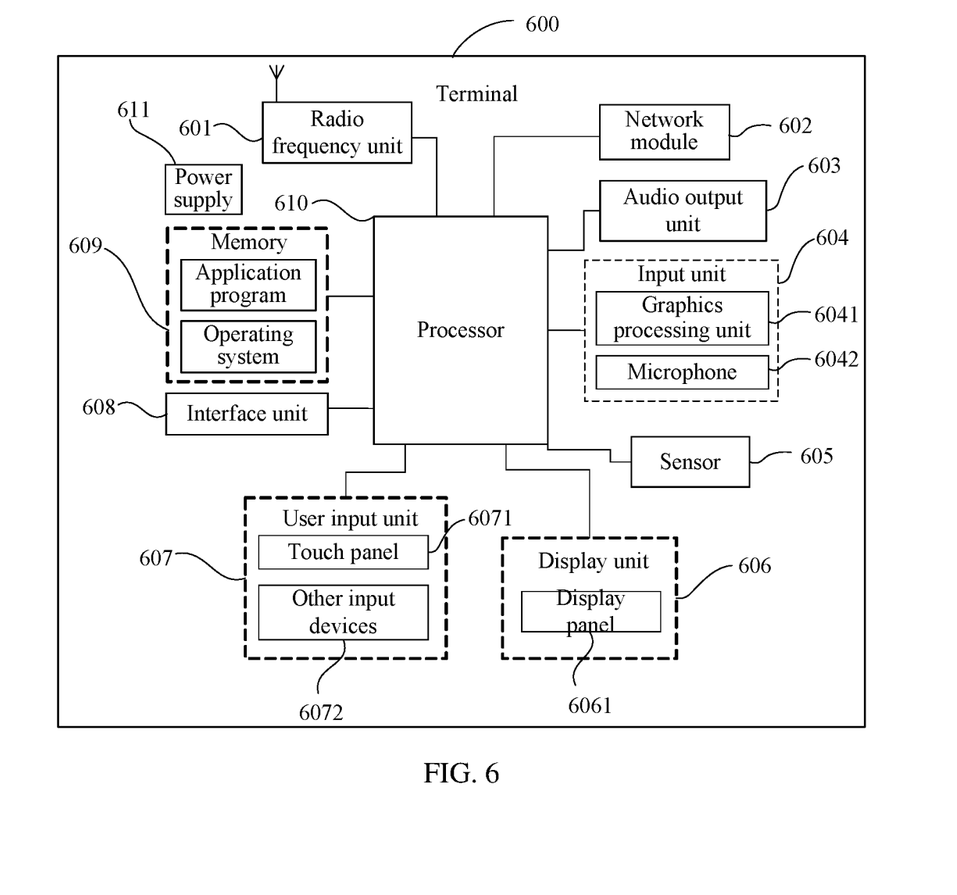
FIG. 6 is a schematic diagram of a hardware structure of a terminal according to an embodiment of this disclosure.

FIG. 6 is a schematic diagram of a hardware structure of a terminal that implements the embodiments of this disclosure. The terminal 600 includes but is not limited to components such as a radio frequency unit 601, a network module 602, an audio output unit 603, an input unit 604, a sensor 605, a display unit 606, a user input unit 607, an interface unit 608, a memory 609, a processor 610, and a power supply 611. A person skilled in the art can understand that the structure of UE shown in FIG. 6 does not constitute any limitation on the UE, and the terminal may include more or fewer components than those shown in the figure, or a combination of some of the components, or a different arrangement of the components. In this embodiment of this disclosure, the terminal includes but is not limited to a mobile phone, a tablet computer, a notebook computer, a palmtop computer, an in-vehicle terminal, a wearable device, a pedometer, or the like.

The terminal is configured with measurement configuration information for a non-connected state. The processor 610 is configured to:

in a process in which the terminal performs radio resource control RRC connection resumption, process CA configuration information based on measurement behavior of the terminal in the non-connected state, or process the CA configuration information according to a processing instruction sent by a network side device, or process the CA configuration information based on the measurement behavior of the terminal in the non-connected state and according to the processing instruction sent by the network side device.

The CA configuration information is access stratum context information stored on the terminal.

The processing instruction is used to instruct to resume at least partial information in the CA configuration information, or is used to instruct to clear at least partial information in the CA configuration information.

Optionally, the step, performed by the processor 610, of processing CA configuration information based on measurement behavior of the terminal in the non-connected state includes:

when the measurement behavior of the terminal in the non-connected state is valid, resuming at least partial information in the CA configuration information; or when the measurement behavior of the terminal in the non-connected state is invalid, clearing at least partial information in the CA configuration information.

Optionally, the step, performed by the processor 610, of processing CA configuration information based on measurement behavior of the terminal in the non-connected state further includes:

when the measurement behavior of the terminal in the non-connected state is valid and non-resumed information exists in the CA configuration information, clearing the non-resumed information in the CA configuration information; or when the measurement behavior of the terminal in the non-connected state is invalid and uncleared information exists in the CA configuration information, resuming the uncleared information in the CA configuration information.

Optionally, the processor 610 is further configured to:
determine whether at least one of the following conditions is met:

a measurement validity timer of the terminal is running;
the terminal is located in a measurement validity area;
the terminal has an available measurement result; or the terminal receives a broadcast message sent by the network side device, where the broadcast message is used to indicate that the network side device is capable of receiving a measurement result of the terminal in the non-connected state, or is used to indicate that a cell supports an enhancing CA utilization function or a fast carrier activation and deactivation function.

If at least one of the conditions is met, the measurement behavior of the terminal in the non-connected state is valid; or if at least one of the conditions is not met, the measurement behavior of the terminal in the non-connected state is invalid.

Optionally, the step, performed by the processor 610, of processing the CA configuration information according to a processing instruction sent by a network side device further includes:

when the processing instruction is used to instruct to resume at least partial information in the CA configuration information, resuming at least partial information in the CA configuration information; or when the processing instruction is used to instruct to clear at least partial information in the CA configuration information, clearing at least partial information in the CA configuration information.

Optionally, the step, performed by the processor 610, of processing the CA configuration information according to a processing instruction sent by a network side device further includes:

when the processing instruction is used to instruct to resume at least partial information in the CA configuration information and non-resumed information exists in the CA configuration information, clearing the non-resumed information in the CA configuration information; or when the processing instruction is used to instruct to clear at least partial information in the CA configuration information and uncleared information exists in the CA configuration information, resuming the uncleared information in the CA configuration information.

Optionally, the step, performed by the processor 610, of processing the CA configuration information based on the measurement behavior of the terminal in the non-connected state and according to the processing instruction sent by the network side device includes:

when the measurement behavior of the terminal in the non-connected state is valid and the processing instruction is used to instruct to resume at least partial information in the CA configuration information, resuming at least partial information in to-be-resumed information indicated in the processing instruction.

Optionally, the step, performed by the processor 610, of processing the CA configuration information based on the measurement behavior of the terminal in the non-connected state and according to the processing instruction sent by the network side device further includes:

when the measurement behavior of the terminal in the non-connected state is valid, the processing instruction is used to instruct to resume at least partial information in the CA configuration information, and non-resumed information exists in the CA configuration information, clearing the non-resumed information in the CA configuration information.

Optionally, the processing instruction is included in an RRC connection resume message sent by the network side device.

Optionally, the CA configuration information includes at least one of the following:

cell type information, cell identifier information, cell state information, cell SDAP layer configuration information, cell PDCP layer configuration information, cell RLC layer configuration information, cell MAC layer configuration information, or cell physical layer configuration information.

Optionally, the cell type includes primary cell or secondary cell;

the cell identifier includes at least one of a secondary cell identifier, a serving cell identifier, a carrier type identifier, or a carrier bandwidth part identifier; and the cell state includes any one of a deactivated state, an activated state, and a dormant state.

In this embodiment of this disclosure, in the RRC connection resumption process, the terminal may process, based on the measurement behavior of the terminal in the non-connected state and/or according to the processing instruction sent by the network side device, the CA configuration information stored on the terminal. The processed CA configuration information may be used for the RRC connection resumption for the terminal, to reduce signaling overheads in the RRC connection resumption process, and further support fast carrier aggregation resumption.

It should be understood that in this embodiment of this disclosure, the radio frequency unit 601 may be configured to receive and send signals in an information reception or transmission or call process. Specifically, after receiving downlink data from a base station, the radio frequency unit 601 sends the downlink data to the processor 610 for processing, and in addition, sends uplink data to the base station. Generally, the radio frequency unit 601 includes but is not limited to an antenna, at least one amplifier, a transceiver, a coupler, a low noise amplifier, a duplexer, and the like. In addition, the radio frequency unit 601 may further communicate with a network and other devices through a wireless communications system.

The terminal provides wireless broadband Internet access for a user by using the network module 602, for example, helps the user send and receive e-mails, browse web pages, and access streaming media.

The audio output unit 603 may convert audio data received by the radio frequency unit 601 or the network module 602 or stored in the memory 609 into an audio signal and output the audio signal as a sound. In addition, the audio output unit 603 may further provide audio output (for example, a call signal received sound or a message received sound) that is related to a specific function performed by the terminal 600. The audio output unit 603 includes a speaker, a buzzer, a telephone receiver, and the like.

The input unit 604 is configured to receive an audio or video signal. The input unit 604 may include a graphics processing unit (GPU) 6041 and a microphone 6042, and the graphics processing unit 6041 processes image data of a still picture or a video obtained by an image capture apparatus (for example, a camera) in an image capture mode or a video capture mode. A processed image frame may be displayed on the display unit 606. An image frame processed by the graphics processing unit 6041 may be stored in the memory 609 (or another storage medium) or sent by the radio frequency unit 601 or the network module 602. The microphone 6042 can receive a sound and can process the sound into audio data. The processed audio data can be converted into a format that can be sent to a mobile communication base station through the radio frequency unit 601 in a telephone call mode, for outputting.

The terminal 600 further includes at least one sensor 605, for example, an optical sensor, a motion sensor, and other sensors. Specifically, the optical sensor includes an ambient light sensor and a proximity sensor. The ambient light sensor may adjust luminance of a display panel 6061 based on brightness of ambient light, and the proximity sensor may turn off the display panel 6061 and backlight when the terminal 600 moves to an ear. As a motion sensor, an accelerometer sensor may detect for a value of an acceleration in various directions (there are usually three axes), may detect for a value and a direction of gravity when the terminal is still, and may be configured to recognize a posture of the terminal (for example, landscape/portrait mode switching, a related game, or magnetometer posture calibration), provide a function related to vibration recognition (for example, a pedometer or a keystroke), or the like. The sensor 605 may further include a fingerprint sensor, a pressure sensor, an iris sensor, a molecular sensor, a gyroscope, a barometer, a hygrometer, a thermometer, or an infrared sensor. Details are not described herein.

The display unit 606 is configured to display information input by the user or information provided for the user. The display unit 606 may include a display panel 6061, and the display panel 6061 may be configured in the form of a liquid crystal display (LCD), an organic light-emitting diode (OLED), or the like.

The user input unit 607 may be configured to receive entered numerical or character information, and generate key signal input that is related to a user setting and function control of the terminal. Specifically, the user input unit 607 includes a touch panel 6071 and other input devices 6072. The touch panel 6071, also referred to as a touchscreen, may capture a touch operation performed by a user on or near the touch panel (for example, an operation performed by the user on the touch panel 6071 or near the touch panel 6071 by using any appropriate object or accessory such as a finger or a stylus). The touch panel 6071 may include two parts: a touch detection apparatus and a touch controller. The touch detection apparatus detects a touch direction of the user, detects a signal carried by a touch operation, and transmits the signal to the touch controller. The touch controller receives touch information from the touch detection apparatus, converts the touch information to point coordinates, and sends the point coordinates to the processor 610, and receives and executes a command sent by the processor 610. In addition, the touch panel 6071 may be implemented in a plurality of forms, for example, as a resistive, capacitive, infrared, or surface acoustic wave touch panel. The user input unit 607 may further include other input devices 6072 in addition to the touch panel 6071. Specifically, the other input devices 6072 may include but are not limited to a physical keyboard, a function key (such as a volume control key or a power on/off key), a trackball, a mouse, a joystick, and the like. Details are not described herein.

Further, the touch panel 6071 may cover the display panel 6061. After detecting a touch operation on or near the touch panel 6071, the touch panel 6071 transmits the touch operation to the processor 610 to determine a type of a touch event. Then the processor 610 provides corresponding visual output on the display panel 6061 based on the type of the touch event. In FIG. 6, the touch panel 6071 and the display panel 6061 serve as two independent components to implement input and output functions of the terminal. However, in some embodiments, the touch panel 6071 and the display panel 6061 may be integrated to implement the input and output functions of the terminal. This is not specifically limited herein.

The interface unit 608 is an interface for connecting an external apparatus to the terminal 600. For example, the external apparatus may include a wired or wireless headphone port, an external power (or battery charger) port, a wired or wireless data port, a memory card port, a port for connecting an apparatus provided with a recognition module, an audio input/output (I/O) port, a video I/O port, an earphone port, and the like. The interface unit 608 may be configured to receive input (for example, data information and power) from the external apparatus, and transmit the received input to one or more elements in the terminal 600; or may be configured to transmit data between the terminal 600 and the external apparatus.

The memory 609 may be configured to store a software program and various data. The memory 609 may mainly include a program storage area and a data storage area. The program storage area may store an operating system, an application program required for at least one function (such as a sound play function and an image play function), and the like. The data storage area may store data created based on use of the mobile phone (such as audio data and a phone book), and the like. In addition, the memory 609 may include a high-speed random access memory, or may include a non-volatile memory, for example, at least one magnetic disk storage device, a flash memory device, or other volatile solid-state storage devices.

The processor 610 is a control center of the terminal that connects various parts of the entire terminal by using various interfaces or lines. The processor 610 performs various functions of the terminal and processes data by running or executing software programs and/or modules stored in the memory 609 and calling data stored in the memory 609, so as to perform overall monitoring on the terminal. The processor 610 may include one or more processing units. Optionally, the processor 610 may integrate an application processor and a modem processor. The application processor mainly processes an operating system, a user interface, an application program, and the like. The modem processor mainly processes wireless communication. It may be understood that the modem processor may alternatively not be integrated into the processor 610.

The terminal 600 may further include a power supply 611 (for example, a battery) that supplies power to the components. Optionally, the power supply 611 may be logically connected to the processor 610 by using a power management system, so as to implement functions such as charging management, discharging management, and power consumption management by using the power management system.

In addition, the terminal 600 may include some functional modules that are not shown. Details are not described herein.

Optionally, an embodiment of this disclosure further provides a terminal, including: a processor 610, a memory 609, and a computer program that is stored in the memory 609 and capable of running on the processor 610. When the computer program is executed by the processor 610, processes in the foregoing embodiments of the CA configuration information processing method are implemented, with the same technical effects achieved. To avoid repetition, details are not described herein again.

An embodiment of this disclosure further provides a computer-readable storage medium. The computer-readable storage medium stores a computer program. When the computer program is executed by a processor, the procedures in the foregoing embodiments of the CA configuration information processing method corresponding to a network side device or a terminal are implemented with the same technical effect achieved. To avoid repetition, details are not described herein again. The computer-readable storage medium is, for example, a read-only memory (ROM), a random access memory (RAM), a magnetic disk, or an optical disk.

It should be noted that, in this specification, the terms "include", "comprise", or any of their variants are intended to cover a non-exclusive inclusion, such that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element.

According to the description of the foregoing implementations, a person skilled in the art can clearly understand that the method in the foregoing embodiments may be implemented by software on a necessary universal hardware platform or by hardware only. In most cases, the former is a more preferred implementation. Based on such an understanding, the technical solutions of this disclosure essentially, or a part contributing to the prior art may be implemented in a form of a software product. The computer software product is stored in a storage medium (for example, a ROM/RAM, a magnetic disk, or an optical disc), and includes several instructions for instructing a terminal (which may be a mobile phone, a computer, a server, an air conditioner, a network device, or the like) to perform the methods described in the embodiments of this disclosure.

The foregoing descriptions are only specific implementations of this disclosure, but are not intended to limit the protection scope of this disclosure. Any variation or replacement readily figured out by a person skilled in the art within the technical scope disclosed in this disclosure shall fall within the protection scope of this disclosure. Therefore, the protection scope of this disclosure shall be subject to the protection scope of the claims.

What is claimed is:

1. A carrier aggregation (CA) configuration information processing method, wherein a terminal is configured with measurement configuration information for a non-connected state, and the method comprises:
in a process in which the terminal performs radio resource control (RRC) connection resumption, processing, by the terminal, CA configuration information based on measurement behavior of the terminal in the non-connected state, or processing, by the terminal, the CA configuration information according to a processing instruction sent by a network side device, or processing, by the terminal, the CA configuration information based on the measurement behavior of the terminal in the non-connected state and according to the processing instruction sent by the network side device, wherein
the CA configuration information is access stratum context information stored on the terminal; and
the processing instruction is used to instruct to resume at least partial information in the CA configuration information, or is used to instruct to clear at least partial information in the CA configuration information,
wherein,
the processing, by the terminal, CA configuration information based on measurement behavior of the terminal in the non-connected state comprises:
when the measurement behavior of the terminal in the non-connected state is valid, resuming, by the terminal, at least partial information in the CA configuration information; or
when the measurement behavior of the terminal in the non-connected state is invalid, clearing, by the terminal, at least partial information in the CA configuration information;
or,
the processing, by the terminal, the CA configuration information according to a processing instruction sent by a network side device comprises:
when the processing instruction is used to instruct to resume at least partial information in the CA configuration information, resuming, by the terminal, at least partial information in the CA configuration information; or
when the processing instruction is used to instruct to clear at least partial information in the CA configuration information, clearing, by the terminal, at least partial information in the CA configuration information;
or,
the processing, by the terminal, the CA configuration information based on the measurement behavior of the terminal in the non-connected state and according to the processing instruction sent by the network side device comprises:
when the measurement behavior of the terminal in the non-connected state is valid and the processing instruction is used to instruct to resume at least partial information in the CA configuration information, resuming, by the terminal, at least partial information in to-be-resumed information indicated in the processing instruction.

2. The method according to claim 1, wherein the processing, by the terminal, CA configuration information based on measurement behavior of the terminal in the non-connected state further comprises:
when the measurement behavior of the terminal in the non-connected state is valid and non-resumed information exists in the CA configuration information, clearing, by the terminal, the non-resumed information in the CA configuration information; or
when the measurement behavior of the terminal in the non-connected state is invalid and uncleared information exists in the CA configuration information, resuming, by the terminal, the uncleared information in the CA configuration information.

3. The method according to claim 1, wherein before the processing, by the terminal, CA configuration information based on measurement behavior of the terminal in the non-connected state, the method further comprises:
determining, by the terminal, whether at least one of the following conditions is met:
a measurement validity timer of the terminal is running;
the terminal is located in a measurement validity area;
the terminal has an available measurement result; or
the terminal receives a broadcast message sent by the network side device, wherein the broadcast message is used to indicate that the network side device is capable of receiving a measurement result of the terminal in the non-connected state, or is used to indicate that a cell supports an enhancing CA utilization function or a fast carrier activation and deactivation function, wherein
if the at least one of the conditions is met, the measurement behavior of the terminal in the non-connected state is valid; or
if at least one of the conditions is not met, the measurement behavior of the terminal in the non-connected state is invalid.

4. The method according to claim 1, wherein the processing, by the terminal, the CA configuration information according to the processing instruction sent by the network side device further comprises:
when the processing instruction is used to instruct to resume at least partial information in the CA configuration information and non-resumed information exists in the CA configuration information, clearing, by the terminal, the non-resumed information in the CA configuration information; or
when the processing instruction is used to instruct to clear at least partial information in the CA configuration information and uncleared information exists in the CA configuration information, resuming, by the terminal, the uncleared information in the CA configuration information.

5. The method according to claim 1, wherein the processing, by the terminal, the CA configuration information based on the measurement behavior of the terminal in the non-connected state and according to the processing instruction sent by the network side device further comprises:
when the measurement behavior of the terminal in the non-connected state is valid, the processing instruction is used to instruct to resume at least partial information in the CA configuration information, and non-resumed information exists in the CA configuration information, clearing, by the terminal, the non-resumed information in the CA configuration information.

6. The method according to claim 1, wherein the CA configuration information comprises at least one of the following:
cell type information, cell identifier information, cell state information, cell SDAP layer configuration information, cell PDCP layer configuration information, cell RLC layer configuration information, cell MAC layer configuration information, or cell physical layer configuration information.

7. A terminal, comprising a memory, a processor, and a computer program stored in the memory and capable of running on the processor, wherein the processor executes the computer program to perform:
in a process in which the terminal performs radio resource control (RRC) connection resumption, processing CA configuration information based on measurement behavior of the terminal in the non-connected state, or processing the CA configuration information according to a processing instruction sent by a network side device, or processing the CA configuration information based on the measurement behavior of the terminal in the non-connected state and according to the processing instruction sent by the network side device, wherein
the CA configuration information is access stratum context information stored on the terminal; and
the processing instruction is used to instruct to resume at least partial information in the CA configuration information, or is used to instruct to clear at least partial information in the CA configuration information, wherein, the processing CA configuration information based on measurement behavior of the terminal in the non-connected state comprises:
when the measurement behavior of the terminal in the non-connected state is valid, resuming at least partial information in the CA configuration information; or
when the measurement behavior of the terminal in the non-connected state is invalid, clearing at least partial information in the CA configuration information;
or,
the processing the CA configuration information according to a processing instruction sent by a network side device comprises:
when the processing instruction is used to instruct to resume at least partial information in the CA configuration information, resuming at least partial information in the CA configuration information; or
when the processing instruction is used to instruct to clear at least partial information in the CA configuration information, clearing at least partial information in the CA configuration information;
or,
the processing the CA configuration information based on the measurement behavior of the terminal in the non-connected state and according to the processing instruction sent by the network side device comprises:
when the measurement behavior of the terminal in the non-connected state is valid and the processing instruction is used to instruct to resume at least partial information in the CA configuration information, resuming at least partial information in to-be-resumed information indicated in the processing instruction.

8. The terminal according to claim 7, wherein the processor executes the computer program to perform:
when the measurement behavior of the terminal in the non-connected state is valid and non-resumed information exists in the CA configuration information, clearing the non-resumed information in the CA configuration information; or
when the measurement behavior of the terminal in the non-connected state is invalid and uncleared information exists in the CA configuration information, resuming the uncleared information in the CA configuration information.

9. The terminal according to claim 7, wherein before the processing CA configuration information based on measurement behavior of the terminal in the non-connected state, the processor executes the computer program to perform:
determining whether at least one of the following conditions is met:
a measurement validity timer of the terminal is running;
the terminal is located in a measurement validity area;
the terminal has an available measurement result; or
the terminal receives a broadcast message sent by the network side device, wherein the broadcast message is used to indicate that the network side device is capable of receiving a measurement result of the terminal in the non-connected state, or is used to indicate that a cell supports an enhancing CA utilization function or a fast carrier activation and deactivation function, wherein
if the at least one of the conditions is met, the measurement behavior of the terminal in the non-connected state is valid; or
if at least one of the conditions is not met, the measurement behavior of the terminal in the non-connected state is invalid.

10. The terminal according to claim 7, wherein the processor executes the computer program to perform:
when the processing instruction is used to instruct to resume at least partial information in the CA configuration information and non-resumed information exists in the CA configuration information, clearing the non-resumed information in the CA configuration information; or
when the processing instruction is used to instruct to clear at least partial information in the CA configuration information and uncleared information exists in the CA configuration information, resuming the uncleared information in the CA configuration information.

11. The terminal according to claim 7, wherein the processor executes the computer program to perform:
when the measurement behavior of the terminal in the non-connected state is valid, the processing instruction is used to instruct to resume at least partial information in the CA configuration information, and non-resumed information exists in the CA configuration information, clearing the non-resumed information in the CA configuration information.

12. The terminal according to claim 7, wherein the processing instruction is comprised in an RRC connection resume message sent by the network side device.

13. The terminal according to claim 7, wherein the CA configuration information comprises at least one of the following:
cell type information, cell identifier information, cell state information, cell SDAP layer configuration information, cell PDCP layer configuration information, cell RLC layer configuration information, cell MAC layer configuration information, or cell physical layer configuration information.

14. A non-transitory computer-readable storage medium storing a computer program, wherein a processor executes the computer program to perform:
in a process in which the terminal performs radio resource control (RRC) connection resumption, processing CA configuration information based on measurement behavior of the terminal in the non-connected state, or processing the CA configuration information according to a processing instruction sent by a network side device, or processing the CA configuration information based on the measurement behavior of the terminal in the non-connected state and according to the processing instruction sent by the network side device, wherein
the CA configuration information is access stratum context information stored on the terminal; and
the processing instruction is used to instruct to resume at least partial information in the CA configuration information, or is used to instruct to clear at least partial information in the CA configuration information,
wherein,
the processing CA configuration information based on measurement behavior of the terminal in the non-connected state comprises:
when the measurement behavior of the terminal in the non-connected state is valid, resuming at least partial information in the CA configuration information; or
when the measurement behavior of the terminal in the non-connected state is invalid, clearing at least partial information in the CA configuration information;
or,
the processing the CA configuration information according to a processing instruction sent by a network side device comprises:
when the processing instruction is used to instruct to resume at least partial information in the CA configuration information, resuming at least partial information in the CA configuration information; or
when the processing instruction is used to instruct to clear at least partial information in the CA configuration information, clearing at least partial information in the CA configuration information;
or,
the processing the CA configuration information based on the measurement behavior of the terminal in the non-connected state and according to the processing instruction sent by the network side device comprises:
when the measurement behavior of the terminal in the non-connected state is valid and the processing instruction is used to instruct to resume at least partial information in the CA configuration information, resuming at least partial information in to-be-resumed information indicated in the processing instruction.

15. The non-transitory computer-readable storage medium according to claim 14, wherein, the processing CA configuration information based on measurement behavior of the terminal in the non-connected state further comprises:
when the measurement behavior of the terminal in the non-connected state is valid and non-resumed information exists in the CA configuration information, clearing the non-resumed information in the CA configuration information; or
when the measurement behavior of the terminal in the non-connected state is invalid and uncleared information exists in the CA configuration information, resuming the uncleared information in the CA configuration information.

16. The non-transitory computer-readable storage medium according to claim 14, wherein, before the processing CA configuration information based on measurement behavior of the terminal in the non-connected state, the processor executes the computer program to further perform:
determining whether at least one of the following conditions is met:
a measurement validity timer of the terminal is running;
the terminal is located in a measurement validity area;
the terminal has an available measurement result; or
the terminal receives a broadcast message sent by the network side device, wherein the broadcast message is used to indicate that the network side device is capable of receiving a measurement result of the terminal in the non-connected state, or is used to indicate that a cell supports an enhancing CA utilization function or a fast carrier activation and deactivation function, wherein
if the at least one of the conditions is met, the measurement behavior of the terminal in the non-connected state is valid; or
if at least one of the conditions is not met, the measurement behavior of the terminal in the non-connected state is invalid.

17. The non-transitory computer-readable storage medium according to claim 14, wherein, the processing the CA configuration information according to the processing instruction sent by the network side device further comprises:
when the processing instruction is used to instruct to resume at least partial information in the CA configuration information and non-resumed information exists in the CA configuration information, clearing the non-resumed information in the CA configuration information; or when the processing instruction is used to instruct to clear at least partial information in the CA configuration information and uncleared information exists in the CA configuration information, resuming the uncleared information in the CA configuration information.

18. The non-transitory computer-readable storage medium according to claim 14, wherein, the processing the CA configuration information based on the measurement behavior of the terminal in the non-connected state and according to the processing instruction sent by the network side device further comprises:

when the measurement behavior of the terminal in the non-connected state is valid, the processing instruction is used to instruct to resume at least partial information in the CA configuration information, and non-resumed information exists in the CA configuration information, clearing the non-resumed information in the CA configuration information.

19. The non-transitory computer-readable storage medium according to claim 14, wherein, the CA configuration information comprises at least one of the following:

cell type information, cell identifier information, cell state information, cell SDAP layer configuration information, cell PDCP layer configuration information, cell RLC layer configuration information, cell MAC layer configuration information, or cell physical layer configuration information.

* * * * *